US010699166B2

(12) United States Patent
Wang et al.

(10) Patent No.: US 10,699,166 B2
(45) Date of Patent: Jun. 30, 2020

(54) FONT ATTRIBUTES FOR FONT RECOGNITION AND SIMILARITY

(71) Applicant: Adobe Inc., San Jose, CA (US)

(72) Inventors: Zhaowen Wang, San Jose, CA (US); Luoqi Liu, Singapore (SG); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 200 days.

(21) Appl. No.: 15/853,120

(22) Filed: Dec. 22, 2017

(65) Prior Publication Data

US 2018/0114097 A1 Apr. 26, 2018

Related U.S. Application Data

(63) Continuation of application No. 14/876,667, filed on Oct. 6, 2015, now Pat. No. 9,875,429.

(51) Int. Cl.
| G06K 9/62 | (2006.01) |
| G06K 9/66 | (2006.01) |
| G06K 9/46 | (2006.01) |
| G06N 3/04 | (2006.01) |
| G06K 9/68 | (2006.01) |

(52) U.S. Cl.
CPC ......... *G06K 9/6257* (2013.01); *G06K 9/4628* (2013.01); *G06K 9/6272* (2013.01); *G06K 9/6277* (2013.01); *G06K 9/66* (2013.01); *G06K 9/6828* (2013.01); *G06N 3/0454* (2013.01); *G06K 2209/01* (2013.01)

(58) Field of Classification Search
CPC .... G06K 9/6277; G06K 9/66; G06K 9/00442; G06K 9/46; G06K 9/4628; G06K 9/52; G06K 9/6272; G06K 9/6828; G06K 2009/4666; G06K 2209/01; G06N 3/0454; G06T 3/40; G06T 7/60
See application file for complete search history.

(56) References Cited

U.S. PATENT DOCUMENTS 5,034,991 A 7/1991 Hagimae et al.
5,060,276 A * 10/1991 Morris ................. G06K 9/3208
382/151

(Continued)

OTHER PUBLICATIONS

"Corrected Notice of Allowance", U.S. Appl. No. 14/876,609, dated Jun. 29, 2018, 2 pages.

(Continued)

*Primary Examiner* — Edward Park
(74) *Attorney, Agent, or Firm* — SBMC

(57) ABSTRACT

Font recognition and similarity determination techniques and systems are described. In a first example, localization techniques are described to train a model using machine learning (e.g., a convolutional neural network) using training images. The model is then used to localize text in a subsequently received image, and may do so automatically and without user intervention, e.g., without specifying any of the edges of a bounding box. In a second example, a deep neural network is directly learned as an embedding function of a model that is usable to determine font similarity. In a third example, techniques are described that leverage attributes described in metadata associated with fonts as part of font recognition and similarity determinations.

20 Claims, 12 Drawing Sheets

(56) References Cited

U.S. PATENT DOCUMENTS

| | | | |
|---|---|---|---|
| 5,167,013 | A | 11/1992 | Hube et al. |
| 5,524,182 | A | 6/1996 | Chari et al. |
| 5,617,484 | A | 4/1997 | Wada et al. |
| 5,664,086 | A | 9/1997 | Brock |
| 5,754,187 | A | 5/1998 | Ristow et al. |
| 5,806,078 | A | 9/1998 | Hug et al. |
| 7,228,501 | B2 | 6/2007 | Brown et al. |
| 7,478,325 | B2 | 1/2009 | Foehr et al. |
| 8,271,470 | B2 | 9/2012 | Gonzalez et al. |
| 8,385,971 | B2 | 2/2013 | Rhoads et al. |
| 8,429,524 | B2 | 4/2013 | Balinsky et al. |
| 8,509,537 | B2 | 8/2013 | Perronnin et al. |
| 9,021,020 | B1 | 4/2015 | Ramaswamy et al. |
| 9,047,511 | B1 | 6/2015 | Vargis C et al. |
| 9,171,202 | B2 | 10/2015 | Hull et al. |
| 9,202,142 | B1* | 12/2015 | Conboy ............... G06K 9/6267 |
| 9,224,068 | B1 | 12/2015 | Ranzato |
| 9,576,196 | B1 | 2/2017 | Natarajan |
| 9,824,304 | B2 | 11/2017 | Wang et al. |
| 9,875,429 | B2 | 1/2018 | Wang et al. |
| 10,007,868 | B2 | 6/2018 | Jin et al. |
| 10,074,042 | B2 | 9/2018 | Wang et al. |
| 10,380,462 | B2 | 8/2019 | Jin et al. |
| 10,467,508 | B2 | 11/2019 | Wang et al. |
| 2005/0246410 | A1 | 11/2005 | Chen et al. |
| 2006/0062460 | A1* | 3/2006 | Jun .......................... G06K 9/325 |
| | | | 382/182 |
| 2006/0078204 | A1 | 4/2006 | Fujimoto et al. |
| 2006/0236237 | A1 | 10/2006 | Peiro et al. |
| 2008/0303822 | A1 | 12/2008 | Taylor et al. |
| 2009/0028443 | A1 | 1/2009 | Chen et al. |
| 2010/0010948 | A1 | 1/2010 | Ito et al. |
| 2010/0183217 | A1* | 7/2010 | Seung ..................... G06K 9/342 |
| | | | 382/156 |
| 2010/0324883 | A1 | 12/2010 | Platt et al. |
| 2011/0115797 | A1 | 5/2011 | Kaplan |
| 2011/0202487 | A1 | 8/2011 | Koshinaka |
| 2011/0271180 | A1 | 11/2011 | Lee |
| 2011/0276872 | A1 | 11/2011 | Kataria et al. |
| 2011/0289407 | A1 | 11/2011 | Naik et al. |
| 2011/0295612 | A1 | 12/2011 | Donneau-Golencer et al. |
| 2012/0078908 | A1 | 3/2012 | Djordjevic et al. |
| 2012/0240039 | A1 | 9/2012 | Walker et al. |
| 2013/0054612 | A1 | 2/2013 | Danielyan et al. |
| 2013/0060786 | A1 | 3/2013 | Serrano et al. |
| 2015/0063713 | A1 | 3/2015 | Yang et al. |
| 2015/0097842 | A1* | 4/2015 | Kaasila ................. G06K 9/6215 |
| | | | 345/471 |
| 2015/0278167 | A1 | 10/2015 | Arnold et al. |
| 2015/0339273 | A1 | 11/2015 | Yang et al. |
| 2015/0348278 | A1 | 12/2015 | Cavedoni et al. |
| 2015/0348300 | A1 | 12/2015 | Kaplan |
| 2016/0259995 | A1 | 9/2016 | Ishii et al. |
| 2016/0292589 | A1* | 10/2016 | Taylor, Jr. ............ G06F 16/1744 |
| 2016/0307347 | A1 | 10/2016 | Matteson et al. |
| 2016/0314377 | A1* | 10/2016 | Vieira ................. G06F 16/9535 |
| 2017/0091951 | A1 | 3/2017 | Yoo et al. |
| 2017/0098138 | A1 | 4/2017 | Wang et al. |
| 2017/0098140 | A1 | 4/2017 | Wang et al. |
| 2017/0098141 | A1 | 4/2017 | Wang et al. |
| 2017/0109600 | A1 | 4/2017 | Voloshynovskiy et al. |
| 2017/0262414 | A1 | 9/2017 | Pao et al. |
| 2018/0082156 | A1 | 3/2018 | Jin et al. |
| 2018/0239995 | A1 | 8/2018 | Wang et al. |
| 2018/0300592 | A1 | 10/2018 | Jin et al. |
| 2019/0325277 | A1 | 10/2019 | Jin et al. |
| 2020/0034671 | A1 | 1/2020 | Maung |

OTHER PUBLICATIONS

"Corrected Notice of Allowance", U.S. Appl. No. 14/876,660, dated Jul. 20, 2017, 4 pages.

"Corrected Notice of Allowance", U.S. Appl. No. 14/876,660, dated Oct. 25, 2017, 2 pages.

"Corrected Notice of Allowance", U.S. Appl. No. 14/876,667, dated Oct. 18, 2017, 2 pages.

"CSS Fonts Module Level 3", Retrieved at: https://drafts.csswg.org/css-fonts/, Jan. 19, 2016, 88 pages.

"First Action Interview Pre-Interview Communication", U.S. Appl. No. 15/269,492, dated Oct. 24, 2017, 3 pages.

"Intellectual property protection of typefaces—Wikipedia", Retrieved at: https://en.wikipedia.org/wiki/Intellectual_property_protection_of_typefaces—on Jun. 7, 2016, 4 pages.

"Notice of Allowance", U.S. Appl. No. 14/876,660, dated Jul. 6, 2017, 8 pages.

"Notice of Allowance", U.S. Appl. No. 14/876,667, dated Sep. 13, 2017, 16 pages.

"Pre-Interview Communication", U.S. Appl. No. 14/876,660, dated Mar. 17, 2017, 3 pages.

"Pre-Interview Communication", U.S. Appl. No. 14/876,667, dated Jul. 28, 2017, 3 pages.

"Restriction Requirement", U.S. Appl. No. 14/876,609, dated Sep. 15, 2017, 7 pages.

"Supplemental Notice of Allowance", U.S. Appl. No. 14/876,667, dated Dec. 27, 2017, 2 pages.

"W3C Recommendation—Fonts", Retrieved at: https://www.w3.org/TR/2011/REC-CSS2-20110607/fonts.html, 2011, 9 pages.

Bell, et al.,' "Learning visual similarity for product design with convolutional neural networks", ACM Transactions on Graphics (TOG)—Proceedings of ACM SIGGRAPH, Aug. 2015, 10 pages.

Cronin, "The Web Designer's Guide to Font Replacement Methods", Retrieved at: http://webdesign.tutsplus.com/articles/the-web-designers-guide-to-font-replacementmethods--webdesign-975, Aug. 3, 2011, 1 page.

Gaultney, "Font Licensing and Protection Details", Oct. 31, 2003, 3 pages.

O'Donovan, et al.,' "Exploratory Font Selection Using Crowdsourced Attributes", ACM Transactions on Graphics, 2014, 9 pages.

Oliver, "Font Replacement Methods: Techniques for Web Fonts", Retrieved at: http://www.instantshift.com/2013/08/29/font-replacement-methods/, Aug. 29, 2013, 11 pages.

Ross, "The Law on Fonts and Typefaces: Frequently Asked Questions", Retrieved at: http://blog.crowdspring.com/2011/03/font-law-licensing, Mar. 23, 2011, 7 pages.

Schoff, et al.,' "FaceNet: A Unified Embedding for Face Recognition and Clustering", CVPR 2015, 2015, pp. 815-823.

Wang, et al.,' "DeepFont: Identify Your Font from An Image", 2015, ACM,Jul. 12, 2015, 9 pages.

Wang, et al.,' "Learning Fine-grained Image Similarity with Deep Ranking", CVPR 2014, Apr. 7, 2014, 8 pages.

"Notice of Allowance", U.S. Appl. No. 16/013,791, dated Mar. 29, 2019, 10 pages.

"Pre-Interview First Office Action", U.S. Appl. No. 15/962,514, dated Apr. 15, 2019, 3 pages.

"Notice of Allowance", U.S. Appl. No. 14/876,609, dated May 3, 2018, 8 pages.

"Pre-Interview First Office Action", U.S. Appl. No. 16/013,791, dated Nov. 23, 2018, 4 pages.

"Combined Search and Examination Report", GB Application No. 1710177.5, dated Dec. 13, 2017, 6 pages.

"Corrected Notice of Allowance", U.S. Appl. No. 15/269,492, dated Feb. 13, 2018, 5 pages.

"Notice of Allowance", U.S. Appl. No. 15/269,492, dated Jan. 18, 2018, 17 pages.

"Pre-Interview Communication", U.S. Appl. No. 14/876,609, dated Feb. 21, 2018, 3 pages.

"Notice of Allowance", U.S. Appl. No. 15/962,514, dated Jun. 21, 2019, 13 pages.

"First Action Interview Office Action", U.S. Appl. No. 16/013,791, dated Jan. 18, 2019, 3 pages.

"Restriction Requirement", U.S. Appl. No. 15/962,514, dated Feb. 14, 2019, 6 pages.

"Corrected Notice of Allowability", U.S. Appl. No. 15/962,514, dated Oct. 7, 2019, 2 pages.

"Foreign Office Action", GB Application No. 1710177.5, dated Mar. 6, 2020, 4 pages.

(56) References Cited

OTHER PUBLICATIONS

"Non-Final Office Action", U.S. Appl.No. 16/502,608, dated Apr. 22, 2020, 13 pages.
"Pre-Interview First Office Action", U.S. Appl.No. 16/502,608, dated Apr. 28, 2020, 4 pages.

* cited by examiner

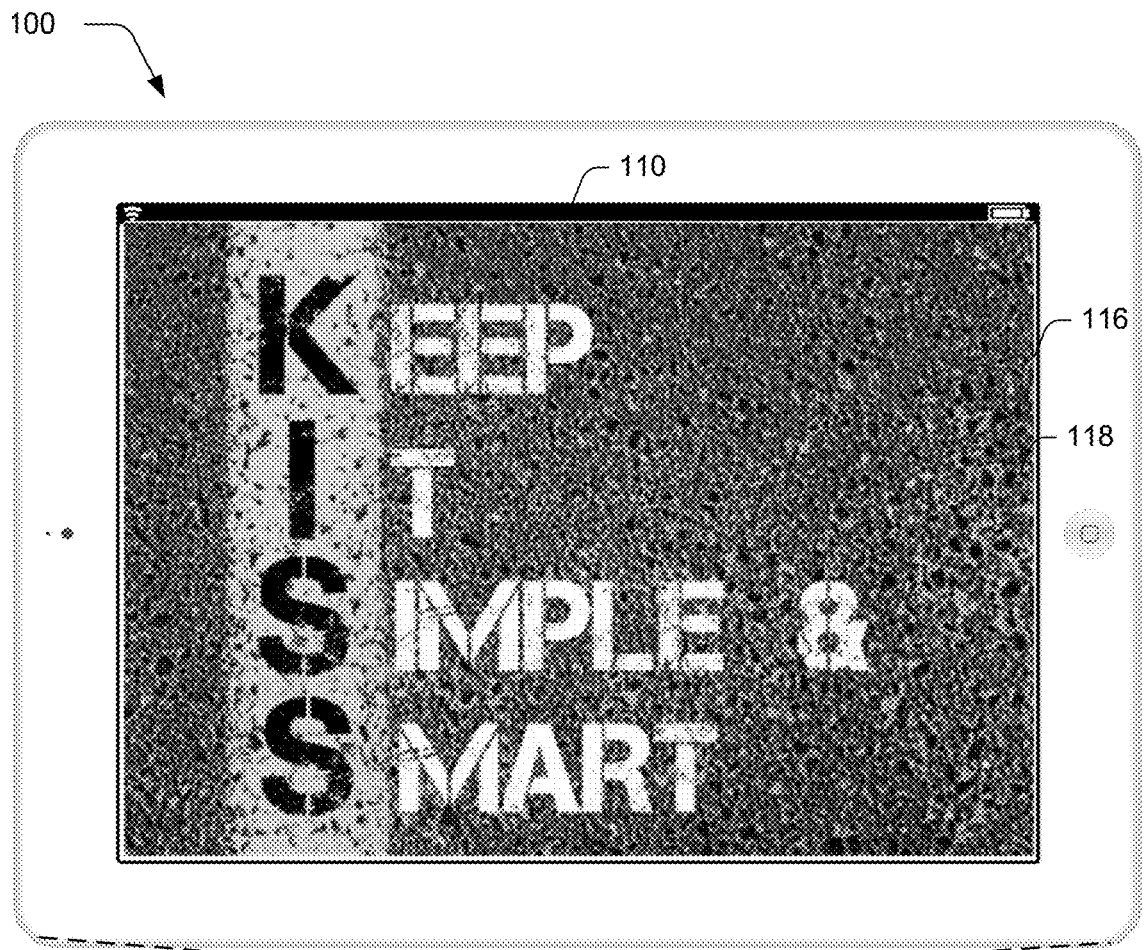
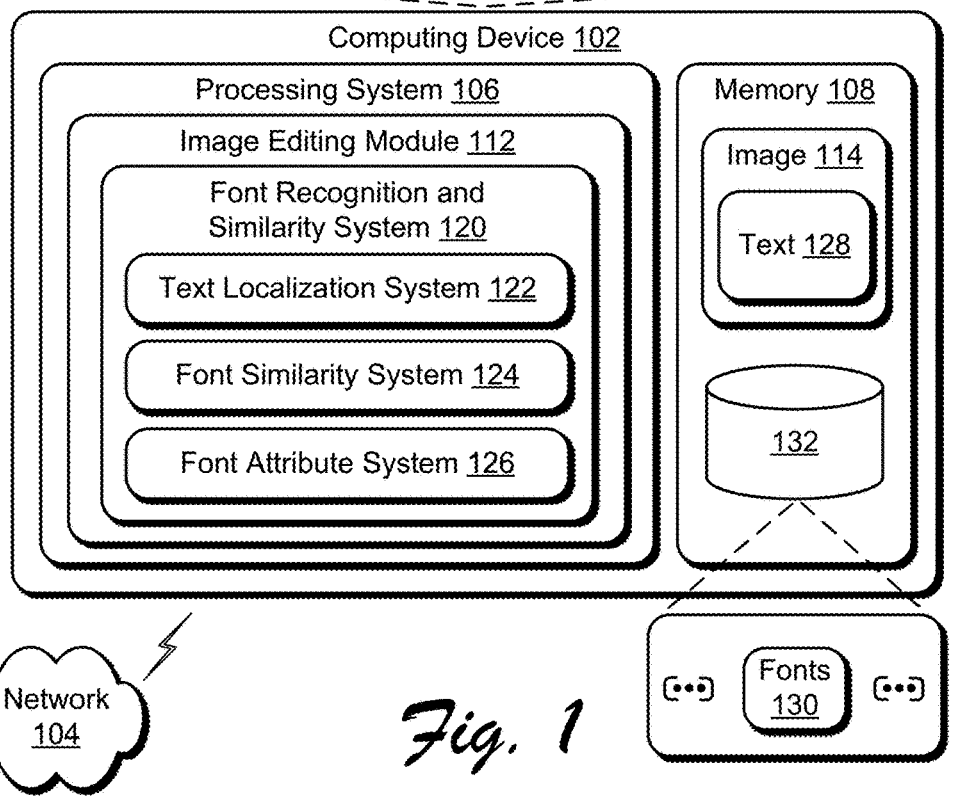
Fig. 1

300

302
Obtain a plurality of training images having text rendered using a corresponding font

304
Train a model to predict a bounding box for text in an image, the model trained using machine learning as applied to the plurality of training images having text rendered using the corresponding font

306
Obtain the model that is trained using machine learning as applied to a plurality of training images having text rendered using a corresponding font

308
Predict a bounding box for text in an image using the obtained model

310
Generate an indication of the predicted bounding box, the indication usable to specify a region of the image that includes the text having a font to be recognized

FORMERLY          Habita

TERRIFIC    *action*

502      502    502
Adobe  are  opera
504     504    504

602  604  606
Military → Military

*Fig. 6*

*The quick brown fox*

Font recognition feature

| # | Model A Postscript | Model A Sample Text |
|---|---|---|
| 1 | Parisine-Std-Italic | *The quick brown fox* |
| 2 | ParisinePlus-Std-Italic | *The quick brown fox* |
| 3 | Idea-Italic | *The quick brown fox* |
| 4 | OpenSans-SemiboldItalic | *The quick brown fox* |
| 5 | Facile-Italic | *The quick brown fox* |

Triplet feature

| Model B Postscript | Model B Sample Text |
|---|---|
| Calluna-Sans-SemiboldItalic | *The quick brown fox* |
| AlegrePro-SemiBoldItalic | *The quick brown fox* |
| Auger-MediumItalic | *The quick brown fox* |
| Idea-Italic | *The quick brown fox* |
| Maxine-MediumItalic | *The quick brown fox* |

FONT ATTRIBUTES FOR FONT RECOGNITION AND SIMILARITY

RELATED MATTERS

This application is a continuation of and claims priority to U.S. patent application Ser. No. 14/876,667, filed Oct. 6, 2015, entitled "Font Attributes for Font Recognition and Similarity", the entire disclosure of which is hereby incorporated by reference herein in its entirety.

BACKGROUND

Creative professionals often utilize a variety of images as part of content creation, such as to generate marketing materials, backgrounds, illustrate books, presentations, and so forth. For instance, creative professionals may create images themselves which are then included in the content, such as for part of a presentation, and may also obtain images from outside sources, such as from a content sharing service. Accordingly, even a single item of content may include a variety of images obtained from a variety of different sources.

In some instances, these images include text, such as text on a road sign, a person's shirt, a logo, and so forth. Text, and the fonts used to render the text in the image, are one of the top elements of design. Accordingly, recognition of a font used to render text within an image and also to find similar fonts (e.g., to promote a similar look and feel to an item of content) is an important factor in creation of content that is visually pleasing to users. Conventional techniques to do so, however, typically rely on manual user interaction on the part of the creative professional, which may introduce errors due to reliance on the manual dexterity of the user that performs this interaction. Although automated techniques have been developed, these are often also prone to error, resource intensive, and inefficient and thus limited to devices having sufficient processing resources to perform these conventional techniques.

SUMMARY

Font recognition and similarity determination techniques and systems are described. In a first example, localization techniques are described to train a model using machine learning (e.g., a convolutional neural network) using training images. The model is then used to localize text in a subsequently received image, and may do so automatically and without user intervention, e.g., without specifying any of the edges of a bounding box. In a second example, a deep neural network is directly learned as an embedding function of a model that is usable to determine font similarity. In a third example, techniques are described that leverage attributes described in metadata associated with fonts as part of font recognition and similarity determinations.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIG. 1 is an illustration of an environment in an example implementation that is operable to employ font recognition and similarity determination techniques described herein.

FIG. 3 is a flow diagram depicting a procedure in an example implementation in which text is localized for use in font recognition and similarity determinations.

FIG. 4 depicts an example implementation showing rendered training examples with different perturbations.

FIG. 5 depicts upper and lower boundaries used as a ground truth for machine learning.

FIG. 6 depicts examples of overlapping crops used for text localization.

FIG. 10 depicts example results of the techniques described herein contrasted with conventional results.

FIG. 13 depicts an example implementation showing features learned form a weight attribute network contrasted with a font recognition feature.

FIG. 14 depicts an example implementation showing italic attribute features learned from a regular-italic attribute network function contrasted with font recognition features.

DETAILED DESCRIPTION

Overview

Figure 2:
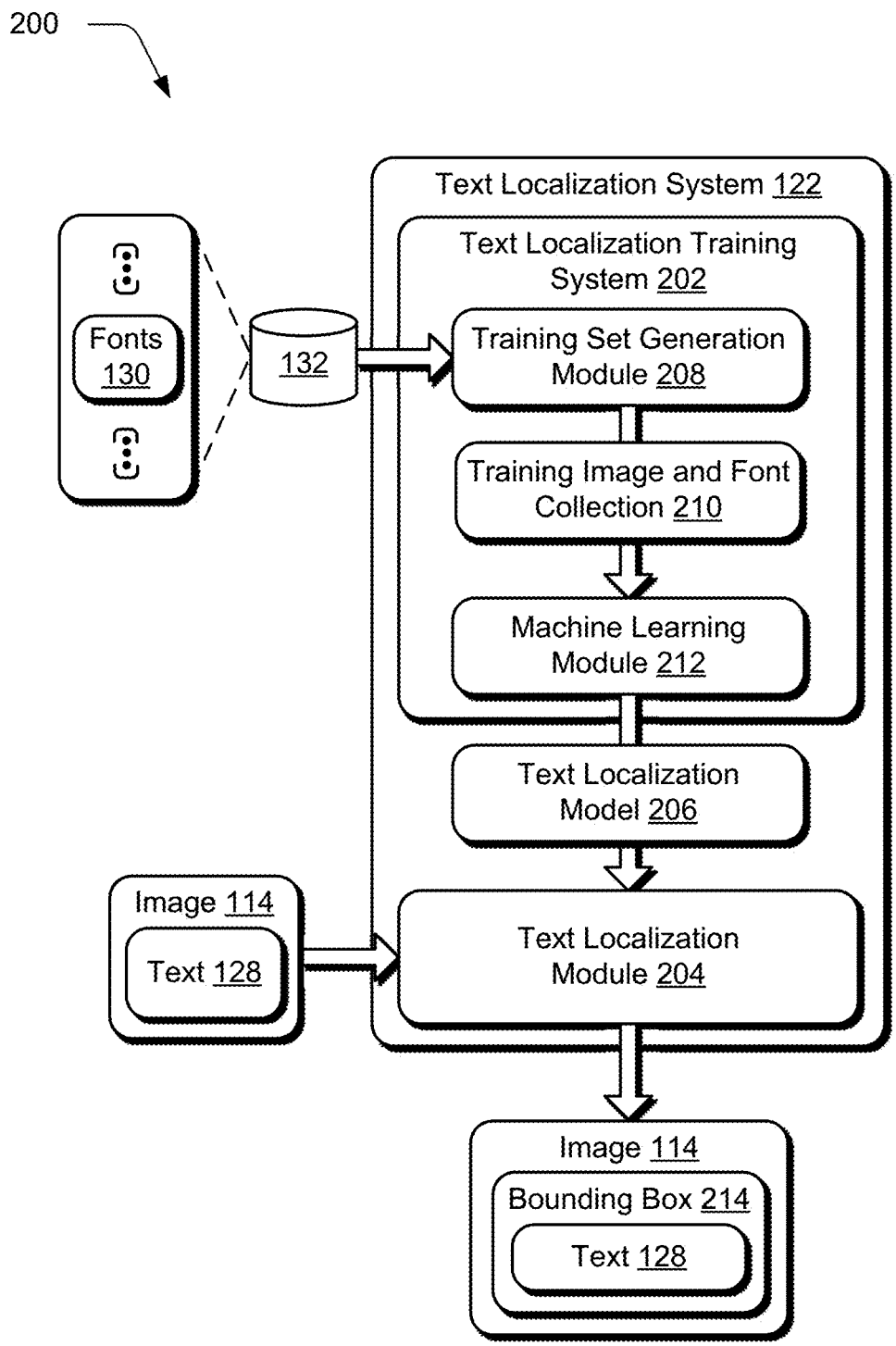
FIG. 2 depicts a system in an example implementation showing a text localization system of FIG. 1 in greater detail.

Fonts used to render text in images and other content are one of the top elements in content design. As fonts are used to present text in content, a user's interaction with the font and text is typically greater than that with other objects in the content as the user typically closely reads the text and then observes the other objects. As such, choice of fonts as well as visual consistency between fonts within content is one of the most important factors in how the content is perceived by a perspective audience.

Conventional digital medium environments used to create content, however, support a limited ability to recognize fonts used to render text within an image as well as to locate similar fonts, such as to promote consistency in appearance in text rendered using the fonts in the content. For example, conventional techniques may rely on manual selection of a portion of an image (e.g., by manually drawing a bounding box that surrounds the portion) that is to be processed to recognize a font used to render text in the bounding box. As such, this conventional technique is limited by accuracy of the manual selection in order to drawn the bounding box and corresponding dexterity of a user doing so.

Accordingly, text localization techniques are described in which a digital medium environment is configured to localize text in an image for an arbitrary font. These techniques also have increased accuracy (e.g., an improvement of approximately double as further described below), have increased efficiency such that these techniques take less than 0.1 second to process an image for a single word on a consumer graphics processing unit, and are not limited to a small set of simple fonts as in conventional automated techniques.

In order to so do, text localization techniques described herein train a model using machine learning (e.g., a convolutional neural network) using training images. The model is then used to localize text in a subsequently received image, and may do so automatically and without user intervention, e.g., without specifying any of the edges of the bounding box. In this way, manual specification of the bounding box in conventional techniques is avoided along with the inaccuracies involved in doing so. Further, these techniques are able to address arbitrary fonts and thus are not limited to a small set of particular fonts in conventional automated techniques, additional discussion of which is described in relation to FIGS. 2-7 in the following.

Also techniques employed by conventional digital medium environments do not support a mechanism to locate similar fonts. Rather, conventional techniques rely solely on classification and not similarity, and thus is focused on discriminating between different fonts rather than retrieving similar fonts. Thus, these conventional techniques are prone to inaccuracies if used for purposes other than classification. Accordingly, techniques are described herein in which font similarity is used to find visually similar fonts for a given font. For instance, font similarity may be used to determine which fonts are similar to a font used to render text in an image, which may be used to navigate through hundreds or even thousands of fonts to find a similar font of interest. In this way, a user may navigate through a vast collection of fonts to locate a font of interest based at least in part on similarity of fonts to a font used to create content in an efficient, intuitive, and accurate manner that promotes visually pleasing content.

In the following, a deep neural network is directly learned as an embedding function of a model that is usable to determine font similarity. Techniques are also described in which data is sampled with increased efficiency to expedite the learning process. Further discussion of these and other examples are also contemplated, further description of which is included in relation to FIGS. 8-10 below.

Further, techniques employed by conventional digital medium environments are limited and ignore potentially useful information in an attempt to perform font recognition and/or similarity. As described above, font recognition involves the challenge of recognizing the font of text from an image, whereas font similarity involves the challenge of finding visually similar fonts for a given font. Both techniques are extremely useful for creative professionals in font selection. Conventional techniques rely solely on an appearance of the fonts themselves to determine similarity and thus ignore other potentially useful information in making this determination. Accordingly, techniques are described herein that leverage attributes (e.g., described in metadata) associated with fonts as part of font recognition and similarity determinations, examples of which are described in further detail in relation to FIGS. 8-14.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to perform text localization, image font recognition, and image font similarity techniques described herein. The illustrated environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" via a network 104 as further described in relation to FIG. 15.

The computing device 102 is illustrated as including a variety of hardware components, examples of which include a processing system 106, an example of a computer-readable storage medium illustrated as memory 108, a display device 110, and so on. The processing system 106 is representative of functionality to perform operations through execution of instructions stored in the memory 108. Although illustrated separately, functionality of these components may be further divided (e.g., over the network 104), combined (e.g., on an application specific integrated circuit), and so forth.

The processing system 104 is illustrated as executing an image editing module 112 which are storable in the memory 106 and as such is implemented at least partially in hardware. The image editing module 112 is executable by the processing system 106 to cause performance of one or more operations. Other implementations are also contemplated, such as implementation as dedicated hardware components, e.g., application specific integrated circuit, fixed-logic circuitry, and so forth.

The image editing module 112 is representative of functionality of the computing device 102 to create (e.g., originate and/or modify) and manage images 114 through interaction with a user interface 116 displayed by the display device 110. For example, a user may use a keyboard, cursor control device, gesture detected by touchscreen functionality of the display device 110, verbal utterance, and so on to interact with the image 114, an example of which is rendered image 118 in the user interface 116 on the display device 110. The image 114 can include a variety of different objects, such as text, shapes or other visual objects, spreadsheets, as a document, a multimedia content, slide presentation, and so on.

An example of functionality to create and edit images is illustrated as a font recognition and similarity system 120. This system 120 is representative of functionality to perform text localization, find similar fonts, and employ font attributes for font recognition and similarity, examples of which are represented by the text localization system 122, font similarity system 124, and font attribute system 126, respectively.

The text localization system 122 is representative of functionality to localize text 128 within an image 114, such as to locate the text "keep it simple and smart" for the rendered image 118 in the user interface 116. The localized text, for instance, may be included in a bounding box that is automatically defined by the text localization system 122 without user intervention. The localized text is then used to recognize which of a plurality of fonts 130 are used to render the text, find similar fonts 130, and so on. Examples of fonts 130 are illustrated in storage 132 of the computing device 102 but may also be maintained over the network 104 as previously described. As the bounding box defines which pixels are to be processed to recognize fonts and/or determine font similarity, accuracy of the bounding box is an important factor in the accuracy of this processing. The techniques described herein similar have improved accuracy and processing efficiency as not being limited by manual dexterity of a user that draws the box or other conventional techniques that are limited to specific fonts, further discussion of which is described in relation to FIGS. 2-7 of the next section.

Another example of functionality of the font recognition and similarity system 120 is represented by the font similarity system 124, which is usable to determine which fonts 130 are similar to fonts used to render text 128 in an image 114. For instance, font similarity may be used to navigate through hundreds or even thousands of fonts to find a similar font of interest. To do so, a deep neural network is directly learned as an embedding function of a model that is usable to determine font similarity, which is then used to locate and view similar fonts as desired by a user. Techniques are also described in which data is sampled with increased efficiency to expedite the learning process. Further discussion of these and other examples are also contemplated, further description of which is included in relation to FIGS. 8-10 below.

A further example of functionality of the font recognition and similarity system 120 is represented by the font attribute system 126, which is usable to employ attributes from metadata as part of font recognition and/or a determination of font similarity. Attributes are typically defined by a designer of the font and may include relative attributes that are usable to define a relationship of fonts within a font family to each other (e.g., weight, regular/italics pairs) and categorical attributes that describe characteristics generally, e.g., Serif versus Sans-Serif. These attributes are learnable as part of a machine learning process to improve accuracy and efficiency of font recognition and similarity determinations, further discussion of which is included in the following in relation to FIGS. 8-14.

Having described a digital medium environment that is operable to employ the techniques described herein, discussion is now made in the following sections further providing examples of functionality represented by the text localization system 122, font similarity system 124, and font attribute system 126, respectively.

Improved Font Recognition using Text Localization

FIGS. 2-7 depicts examples of the text localization system 122 of FIG. 2 in greater detail. The text localization system 122 addresses the challenge of finding and defining a boundary surrounding text that is included in an image. In one example, localization involves computation of a bounding box of the text in an input image, which describes what portion of the image includes the rendered font. The bounding box then serves as a basis for font recognition and similarity determinations as defining which pixels in the image include the rendered text that is to serve as a basis for processing performed to support these determinations.

This has particular importance in content creation as use of particular fonts is one of the top elements in design, for as previously described user interaction with text and fonts used to render text is typically higher than with other objects in an image. Thus, determination of which fonts are used to render text in an image and determination of which fonts are similar to the determined fonts are important factors in content creation. Accordingly, accuracy of text localization used to support these techniques is an equally important factor.

For example, a user may select an image having text for inclusion as part of content, e.g., a marketing campaign. In order to keep a consistent look and feel to the content, font recognition may be performed to determine which font is used to render the text and font similarity may be performed to locate fonts that are similar to this font. In this way, a creative professional may include additional text as part of creating the content that has a similar look and feel by causing the text to be rendered using the same or similar fonts.

There are two kinds of related conventional algorithms: text detection and optical character recognition. Both of these conventional algorithms are used to detect presence of text in an image and are typically limited to a small set of predefined fonts. As such, these conventional algorithms often fail for complicated fonts such as script fonts and decorative fonts and thus have limited applicability in real world applications.

In the following, techniques and systems are described to automatically localize a text region in an image to improve accuracy in defining boundaries of a bounding box. These techniques employ machine learning (e.g., a deep convolutional neural network) and thus exhibit improved resource consumption (e.g., both in amount of resources used and time used by those resources) and are usable for arbitrary fonts. Thus, these techniques may be performed to localize text without knowledge of which particular fonts are being used to render the text and thus expands applicability to a wider range of fonts. For example, script and decorative fonts may be processed using the techniques described herein which is not possible using conventional text detection or optical character recognition algorithms as described above. In one or more implementations, these techniques are usable to significantly improve font recognition accuracy, from a conventional accuracy of 40.2% and 59.2% for top-1 and top-5 tiers, respectively, to accuracies of 76.3% and 93.3% for top-1 and top-5 tiers. Thus, a 90% improvement may be observed in terms of the top-1 accuracy with improved resource consumption using the techniques described below.

FIG. 2 depicts a system 200 in an example implementation showing the text localization system 122 of FIG. 1 in greater detail and FIG. 3 depicts a procedure 300 in an example implementation that is used to train and use a model to perform text localization. In the following, reference is made interchangeably to both FIGS. 2 and 3.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The text localization system 122 is illustrated as including a text localization training system 202 and a text localization module 204. The text localization training system 202 is representative of functionality that is usable to generate a text localization model 206, e.g., via machine learning. The text localization model 206 is then used by the text localization module 204 to localize text 128 in an image 114, e.g., to find a bounding box of the text for font recognition or similarity determinations. As the bounding box defines which pixels are to be processed to perform this determination, accuracy of the bounding box in capturing rendered text is a primary component in the accuracy of the font recognition determination and font similarity determination.

A machine learning approach is taken by the text localization system 122 to train the text localization model 206 by the text localization training system 202 and to perform text localization using the model by the text localization module 204. By doing so, the text localization system 122 is able to address the tens of thousands of fonts and corresponding text appearance changes for rendered text 128 in an image 114, which is not possible using conventional hand-designed algorithms that are limited to particular fonts. Thus, even though a relatively moderate number of general font types may be used to generate the text localization module 206 in this example, the text localization model 206 may be employed to perform text localization even for other fonts not were not used, particularly, to train the model. In one or more implementations, however, the text localization model 206 may be fine-tuned on a particular set of fonts and application settings. For instance, the text localization training system 202 can train the text localization model 206 for images taken on a cellphone by synthesizing images according to the cellphone imaging process, e.g., by adding particular JPEG compression, and so forth.

In the text localization system 122 there is a training phase in which the text localization model 206 is generated and a testing phase in which the model is employed for an input image. In this example, the text localization training system 202 is utilized offline and the test phase involving use of the image 114 is performed in real time, although other examples are also contemplated. State-of-the-art convolutional neural networks are used as the architecture. Batch based stochastic gradient descent is used as a training algorithm in the following, although other examples are also contemplated. This may be used to perform text localization to provide precise bounding boxes, and may be used to train the model to match settings of the font recognition techniques described herein to increase accuracy as further described below.

To begin, a training set generation module 208 is utilized to generate a training image and font collection 210 that includes training images that are to serve as a basis for training the text localization model 206. The training image and font collection 210, for example, may be generated as synthetic images using fonts 130. For instance, the training set generation module 208 renders text in images using a selection of fonts 130 and may add perturbations (e.g., rotations, skew, and so on) as further described below to generate the training image and font collection 210.

For example, in order to make the training set more diversified and more robust to noises, random perturbations may be added by the training set generation module 208 during and/or after rendering of text. Examples of perturbations include kerning offset, downscaling, background/foreground intensity, text color flipping, shading, rotation, squeezing, cropping and noise. An example implementation of rendering parameters is listed in the following:

| Perturbation parameter | Value | Comments |
|---|---|---|
| pert_ns | 10 | Noise variance |
| pert_sc | 1.5, 2.0 | Downscaling factor range |
| pert_sh | 0.2, 0.5 | Shading gradient range |
| kerning | −5, 350 | Kerning offset range |
| pert_bg | 130, 200 | Background color range |
| pert_fl | 1 | Black/white flipping |
| pert_fg | 50, 120 | Foreground color range |
| pert_rt | 4 | Maximum rotation angle |
| squeeze | 1.5, 2.5, 3.5 | Squeezing factors |
| pert_mg | −70, 0 | Margin range (outside text) |
| font_size | 200 | Font size |

FIG. 4 depicts an example implementation 400 showing rendered training examples with different perturbations selected from the table above. Other examples are also contemplated, such as to form the training image and font collection 210 from "real" images that are not synthetically generated.

Regardless of how generated, a machine learning module 212 obtains the training image and font collection 210. The collection includes a plurality of training images having text rendered using a corresponding font (block 302). A model is trained by the machine learning module 212 to predict a bounding box for text in an image. The model is trained using machine learning as applied to the plurality of training images having text rendered using the corresponding font (block 304).

Normalized y-coordinates of upper boundary "$y_u$" 502 and baseline "$y_b$" 504 are used as the ground truth for machine learning as shown in an example implementation 500 of FIG. 5. For example, the upper boundary 502 is the highest horizontal line of the text area and the lower boundary 504 is the baseline of text. The upper and lower boundaries "$y_u$" and "$y_b$" 502, 504 are normalized by the original image height. The x-coordinates of the bounding box may be represented similarly and are omitted in the following discussion for the sake of simplicity of the discussion.

The machine learning module 212 may employ a variety of different techniques to train the text localization model 206, an example of which is a convolutional neural network. To train this network, the initial learning rate is set to 0.01 for the machine learning module 212 in this example and is reduced to 0.001 in the middle of training. Batch size is set to 128, momentum is set to 0.9 and weight decay is set to 0.0005 for all the layers. Dropout ratio after fc7 and fc8 is set to 0.5. The network structure is listed as following:

| Name | type | Kernel size/stride | Output size |
|---|---|---|---|
| Input | input | | 111x111x1 |
| conv1 | convolution | 11x11/2 | 51x51x64 |
| pool1 | pooling | 3x3/2 | 25x25x64 |
| conv2 | convolution | 5x5/1 | 21x21x128 |
| pool2 | pooling | 3x3/2 | 10x10x128 |
| conv3 | convolution | 3x3/1 | 10x10x256 |
| conv4 | convolution | 3x3/1 | 10x10x256 |
| conv5 | convolution | 3x3/1 | 10x10x256 |
| pool5 | pooling | 5x5/5 | 2x2x256 |
| fc7 | fully connected | | 1x1x1024 |
| fc8 | fully connected | | 1x1x2 |

A squared 12 loss is used as the loss function, an example of which is expressed as follows:

$$loss = \|y - f(x)\|^2,$$

in which "y" is normalized ground truth, and "f(x)" is the output of "fc8." The network is learned by a stochastic gradient decent technique.

The machine learning module 212 may employ a variety of different techniques to train the convolutional neural network. In a first such example, the machine learning module 212 starts from a random initialization of the neural network. In a second such example, the machine learning module 212 starts from a classification network which is trained for a classification task. An advantage may be observed by starting from the classification network and this technique tends to converge faster as there are fewer parameters to learn. Additionally, if the convolutional layers are fixed then the network is smaller as the parameters are shared with the classification network and thus exhibits improved efficiency. Thus, at this point the text localization training system 202 has generated a text localization model 206 that is usable to localize text 128 in a received image 114 as further described below.

The text localization module 204 of the text localization system 122 then receives the text localization module 206 for testing, i.e., to localize text 128 in a received image 114. Thus, the text localization module 204 first obtains the model 206 that is trained using machine learning as applied to a plurality of training images having text rendered using a corresponding font (block 306). A bounding box 214 for text 128 in an image 114 is predicted using the obtained model 206 (block 308) and an indication is generated of the predicted bounding box 214. The indication is usable to specify a region of the image that includes the text having a font to be recognized (block 310).

For example, a horizontal squeeze (2.5×) is first applied to the image 114 at test time, an amount of which matching a training setting of the text localization training system 202 to generate the text localization model 206. This is used to improve processing efficiency and accuracy.

Overlapping crops 602, 604, 606 are then formed from the squeezed image as shown in an example implementation 600 of FIG. 6. The cropped images have predefined sizes (e.g., 111×111 pixels) and are denoted as "$x_1, x_2, \ldots, x_M$" in the following. Each cropped image 602, 604, 606 is then fed independently into the trained convolutional network of the text localization model 206. The text localization model 206, through processing using the text localization module 204, is thus used to obtain bounding box prediction for each cropped image 602, 604, 606, which are represented by values of "$f(x_1), f(x_2), \ldots, f(x_M)$" in the following.

The text localization module 204 then generates a resulting bounding box 214, which may be calculated in a variety of ways. In a first example, an average is calculated for both top and bottom lines for the bounding box predictions obtained for the cropped images 620, 604, 606, e.g., upper boundary and baseline as described above. In another example, a median is calculated for both top and bottom lines for the bounding box predictions obtained for the cropped images 620, 604, 606. A line fitting algorithm may also be used to fit lines to both top and bottom lines separately or jointly from the cropped images, which may also be used to determine a rotation of text 128 in the image 114.

Figure 7:
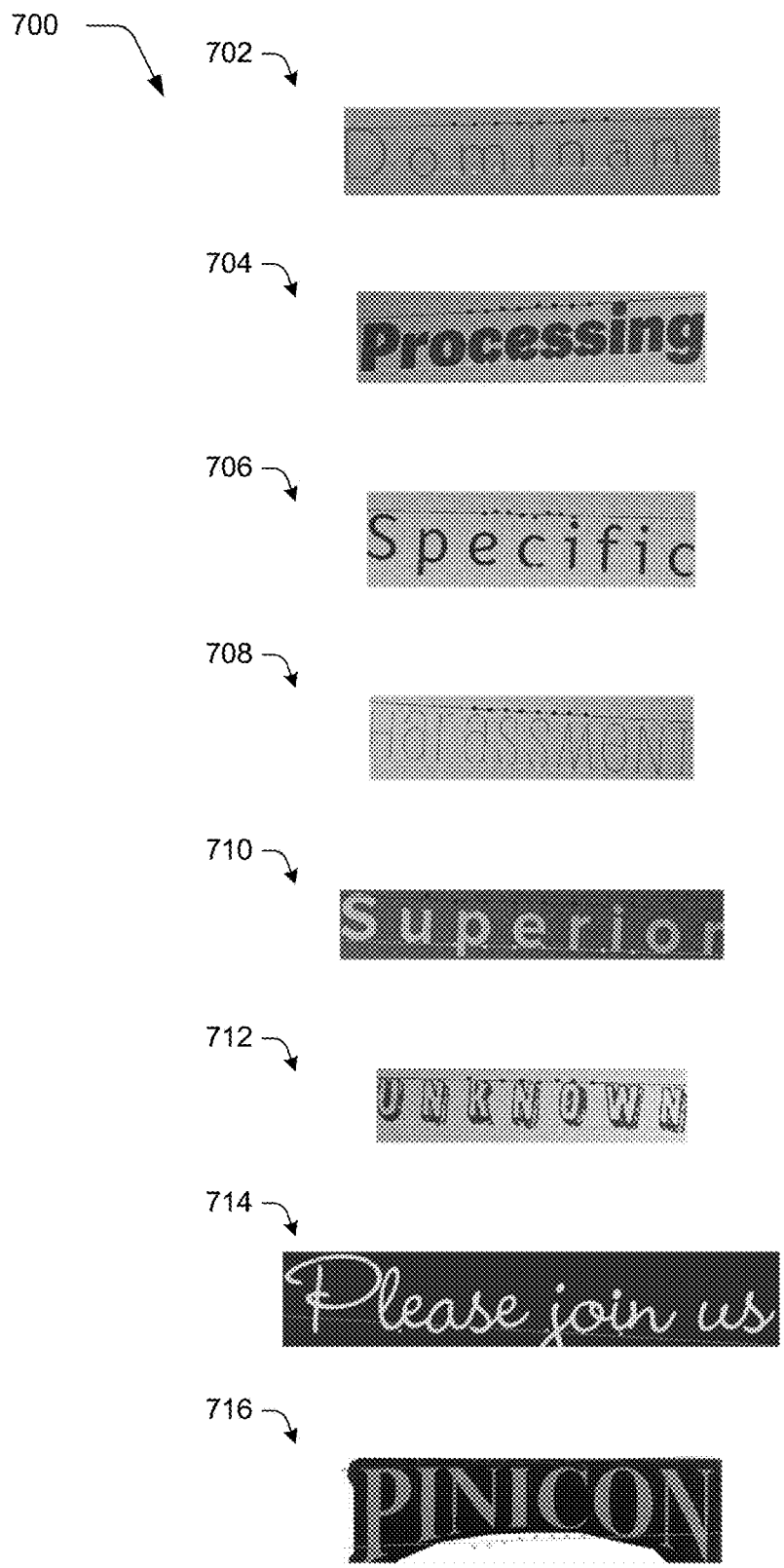
FIG. 7 depicts an example implementation of localization results with line fitting.

FIG. 7 depicts an example implementation of localization results 702, 704, 706, 708, 710, 712, 714, 716 with line fitting. The lines are indications of the upper and lower boundaries as indicated by the bounding box 214. Dots illustrated along these lines represent predicted "y" locations of each of the crops. The last two localization results 714, 716 are obtained by processing real text images with irregular layouts, which are accurately addressed by the text localization system 122.

Through use of machine learning as described above, the text localization module 206 is usable to localize the text 128 in an image 114 for arbitrary font, which as previously described is not possible using conventional techniques that are limited to a small set of simple predefined fonts, and thus often fail for script fonts, decorative fonts, and so forth. These techniques are also resource efficient and fast, and are able to process a single word of text in an image 114 in less than 0.1 second. Furthermore, these techniques also improve the recognition accuracy significantly, going from (40.2%, 59.2%) top-1 and top-5 tier accuracy to (76.3%, 93.3%), which is 90% improvement in terms of the top-1 accuracy. Having now described an example of text localization for font recognition and similarity, an example involving visual font similarity is described in the following section.

Determination of Font Similarity

Figure 8:
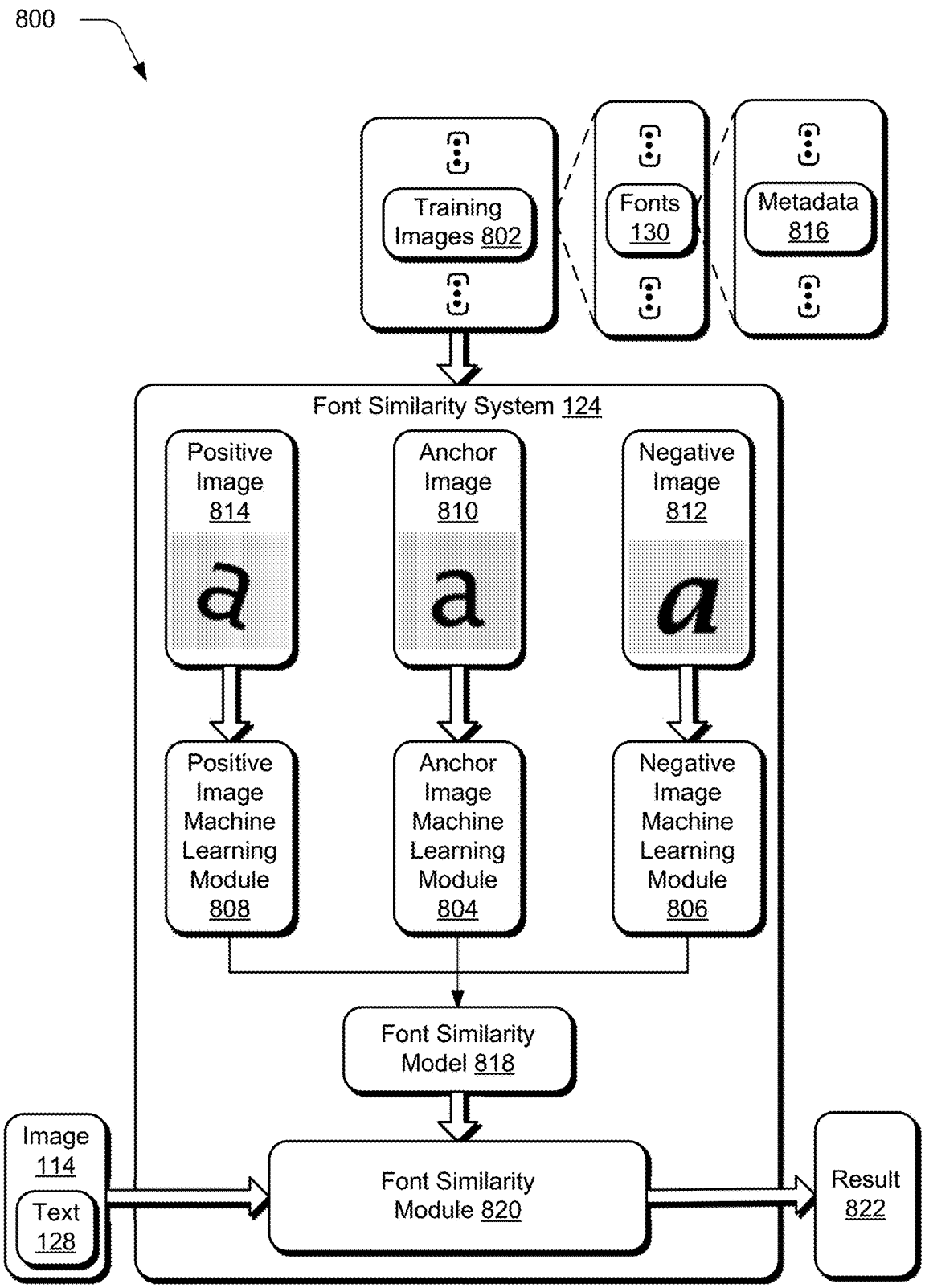
FIG. 8 depicts a system in an example implementation showing a text similarity system of FIG. 1 in greater detail.
Figure 9:
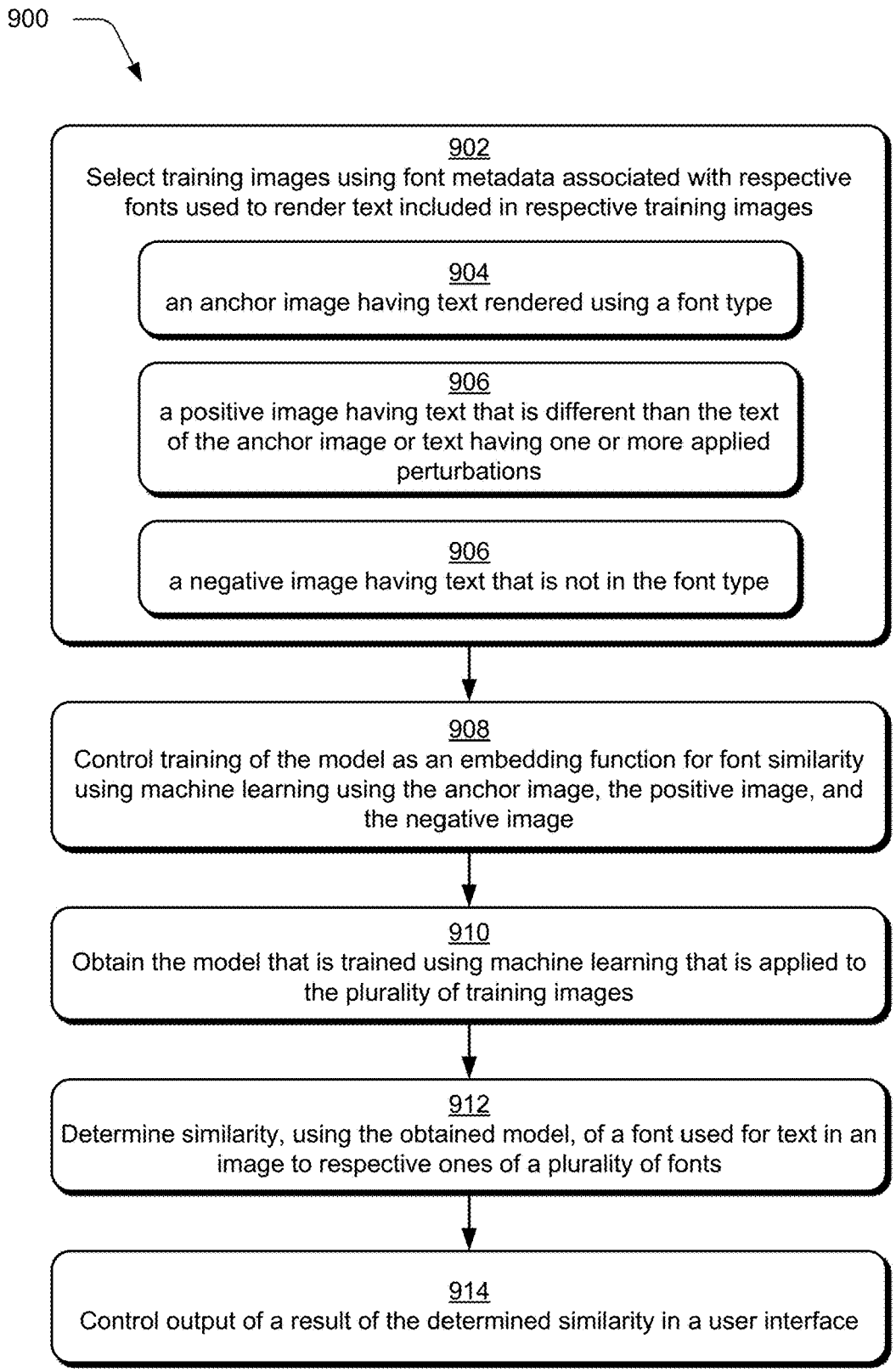
FIG. 9 is a flow diagram depicting a procedure in an example implementation that is used to train and use a model to determine font similarity.

FIG. 8 depicts a system 800 in an example implementation showing the text similarity system 124 of FIG. 1 in greater detail and FIG. 9 depicts a procedure 900 in an example implementation that is used to train and use a model to determine font similarity. In the following, reference is made interchangeably to both FIGS. 8 and 9.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

Font similarity involves the challenge of finding visually similar fonts for a given font. As previously described, as font choice is one of the most important design considerations in creating content, location of similar fonts is equally important in content creation. For instance, font similarity may be used to determine which fonts are similar to a font used to render text in an image, which may be used to navigate through hundreds or even thousands of fonts to find a similar font of interest. In this way, a user may navigate through a vast collection of fonts to locate a font of interest based at least in part on similarity of fonts to a font used to create content in an efficient, intuitive, and accurate manner.

Conventional techniques used to process fonts are based on training a convolutional neural network for font classification. In other words, these conventional techniques are not directly aimed at font similarity but rather are targeted at discriminating between different fonts rather than retrieving similar fonts and accordingly is inaccurate for this purpose. Therefore, the performance of these conventional techniques is rather limited, as opposed to the techniques described herein that are directly aimed at learning features for font similarity.

Techniques and systems are described to determine font similarity by comparing features from a learned network for different fonts. Rather than learn a network for classification and using a feature of the network for classification as performed in conventional techniques, a deep neural network is directly learned as an embedding function of a model that is usable to determine font similarity. Techniques are also described in which data is sampled with increased efficiency to expedite the learning process.

First, training images are selected using font metadata associated with respective fonts used to render text included in respective training images (block 902). The font similarity system 124 employs a data sampling scheme which is computationally efficient and customized to address the font similarity problem. The space of the training data is composed of triplet combinations of images, which is too large to enumerate as a whole. Accordingly, font metadata is employed to design a triplet sampling distribution to increase a likelihood that relevant triplets from the training set are used for feature computation and model training.

As an overview, the font similarity system 124 is configured to learn an embedding function for font similarity using machine learning and the entire system is learned end-to-end. To do so, the font similarity system 124 takes as inputs training images 802 having text rendered using different fonts 130. The embedding function of the model is then automatically learned without user intervention when the neural network is optimized using back-propagation. Training images 802 may take a variety of forms, such as synthetic or real images as described in the previous section.

The neural network of the font similarity system 124 includes three identical columns in this example, which are represented by an anchor image machine learning module 804, a positive image machine learning module 806, and a negative image machine learning module 808. The anchor image machine learning module 804, positive image machine learning module 806, and negative image machine learning module 808 are configured to process an anchor image 610, positive image 812, and negative image 814 (blocks 904, 906, 908) having characteristics that are described in greater detail below. Each column may have a structure as shown in the table below.

| Name | Type | Kernel size/Stride | Output size |
|---|---|---|---|
| Input | input | | 111x111x1 |
| conv1 | convolution | 11x11/2 | 51x51x64 |
| pool1 | pooling | 3x3/2 | 25x25x64 |
| conv2 | convolution | 5x5/1 | 21x21x128 |
| pool2 | pooling | 3x3/2 | 10x10x128 |
| conv3 | convolution | 3x3/1 | 10x10x256 |
| conv4 | convolution | 3x3/1 | 10x10x256 |
| conv5 | convolution | 3x3/1 | 10x10x256 |
| pool5 | pooling | 5x5/5 | 2x2x256 |
| fc7 | fully connected | | 1024 |
| fc8 | fully connected | | 256 |
| Norm | L2 normalization | | 256 |

The three columns are constrained to be identical in both structure and parameter, i.e., there is only a single set of parameters to learn. The loss function learned to form the model may be expressed as follows:

$$\sum_{k=0}^{n} [\|f(x_A) - f(x_P)\| - \|f(x_A) - f(x_N)\| + \alpha]_+$$

where "$x_A$," "$x_p$," and "$x_N$" are the anchor image, positive image, and negative image respectively, and "$\alpha$" is a parameter used to control a permissible margin of differences between positive image and negative image. The anchor image 812, as the name implies, is a training image that is to be used as a basis for comparison as part of the machine learning with the positive and negative images 821, 814. The positive image "$x_p$" 812 has a font type as $x_A$ that matches a font type of the anchor image 812, but is rendered with different text or random perturbation as described in the previous section. The negative image "$x_N$" has a different font type than that of the anchor image 810.

The font similarity system 124 is configured obtain fast convergence (training speed) in the training of the model by selecting triplets (i.e., training images 802 that include the anchor, positive, and negative images 810, 812, 814) that violate a triplet constraint. To achieve this, the font similarity system 124 employs metadata 816 associated with the fonts 130. The metadata 816 is typically assigned to each font 130 are part of designing the fonts 130. The metadata 816 may describe a variety of characteristics of the fonts 130, such as a family (i.e., type) to which the font 130 belongs, line weight, whether regular or italic, recommended use, calligraphy style, and so forth. The metadata 816 is categorical and can be encoded as a binary vector "m" where a zero/one entry indicates the presence/absence of a certain font property.

When sampling a triplet of images, an anchor image "$x_A$" 810 is first uniformly sampled from each of the fonts 130 and corresponding font metadata 816 is denoted in the following as "$m_A$." The positive image "$x_p$" 812 is then uniformly sampled by the font similarity system 124 from the same font type as a font type used for the anchor image "$x_A$" 810. This step is efficient because the number of images belonging to the same font type is relatively small. Lastly, the font similarity system 124 samples the negative image 814 font "$F_N$" with metadata "$m_N$" from each of the font types that is different from the font type of the anchor image "$x_A$" 810 with the following probability distribution:

$$p(F_N) = \frac{1}{Z} e^{-\beta \cdot d(m_A, m_N)}$$

where "$d(m_A, m_N)$" is a Hamming distance between the metadata vectors, and "$\beta$" is a positive coefficient. The value "Z" is a normalization factor defined as follows:

$$Z = \sum_{F_N \neq F_A} e^{-\beta \cdot d(m_A, m_N)}$$

The final negative image "$x_N$" 814 is randomly drawn from the font type "$F_N$." In one or more implementations, the distance matrix "$\{d(m_1, m_2)\}$" is pre-calculated and thus negative images are sampled in an efficient manner.

The training of the font similarity model 818 is then controlled by the font similarity system 124 as an embedding function for font similarity as part of machine learning using the anchor image, the positive image, and the negative image (block 908). To train the model 818 using a deep convolutional neural network, for instance, the initial learning rate is set to 0.01 and is reduced to 0.001 in the middle of training. Batch size is set to 128. Momentum is set to 0.9 and weight decay is set to 0.0005 for each of the layers in the deep convolutional neural network. Dropout ratio after layers "fc7" and "fc8" of the deep convolutional neural network is set to 0.5. The margin "$\alpha$" is set to 0.1 and "$\beta$" is set to be the inverse of the length of metadata 816 binary vector.

The font similarity model 818 is then obtained by the font similarity module 820 that was trained using machine learning as applied to the plurality of images (block 910). For example, the font similarity model 818 may be trained offline by the font similarity system 124 and then used in real time to process an image 114. A determination is then made by the font similarity module 820 using the obtained model 818 as to similarity of a font used for text 128 in an image 114 with respect to a plurality of fonts 130 (block 912), which may include text localization as described in the previous section.

Output of a result 822 of the determined similarity in a user interface is controlled (block 914) by the font similarity system 124. The font similarity system 124, for instance, may output a list of fonts that are similar, apply the fonts to selected text, and so forth in a user interface output by the computing device 102. An example of results 1002 in shown in an example implementation 1000 depicted in FIG. 10 as contrasted with a conventional result 1004. The figure shows an example of retrieving similar fonts to "AauxNext-Semi-BoldItalic" using both a font recognition feature and the described triplet network feature. In the top 5 retrieval results, the techniques described herein find more fonts with "SemiboldItalic" or "MediumItalic" styles, which are visually more similar to the query font. A variety of other examples are also contemplated.

Font Attributes for Font Recognition and Similarity

Figure 11:
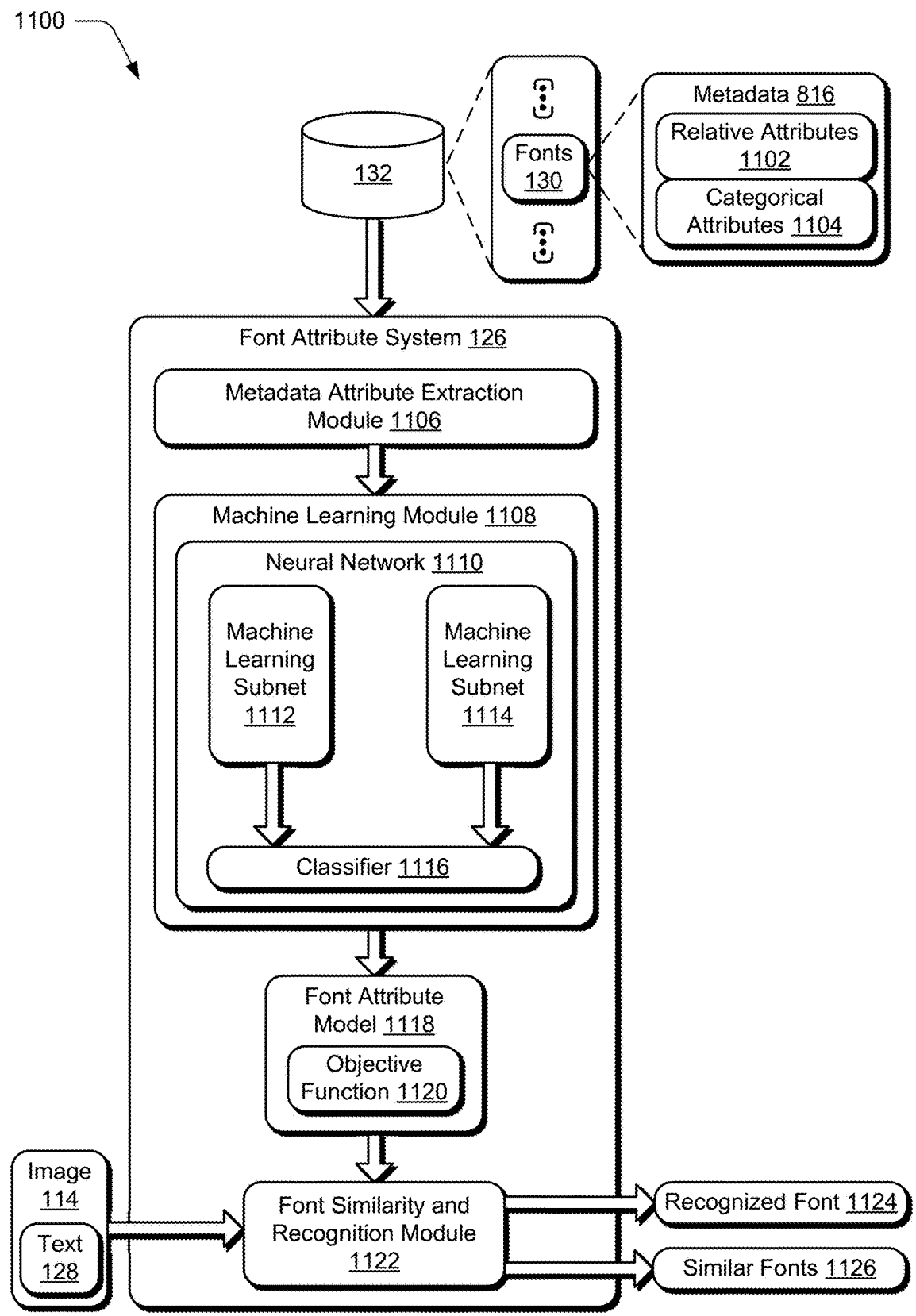
FIG. 11 depicts a system in an example implementation showing a font attribute system of FIG. 1 in greater detail.
Figure 12:
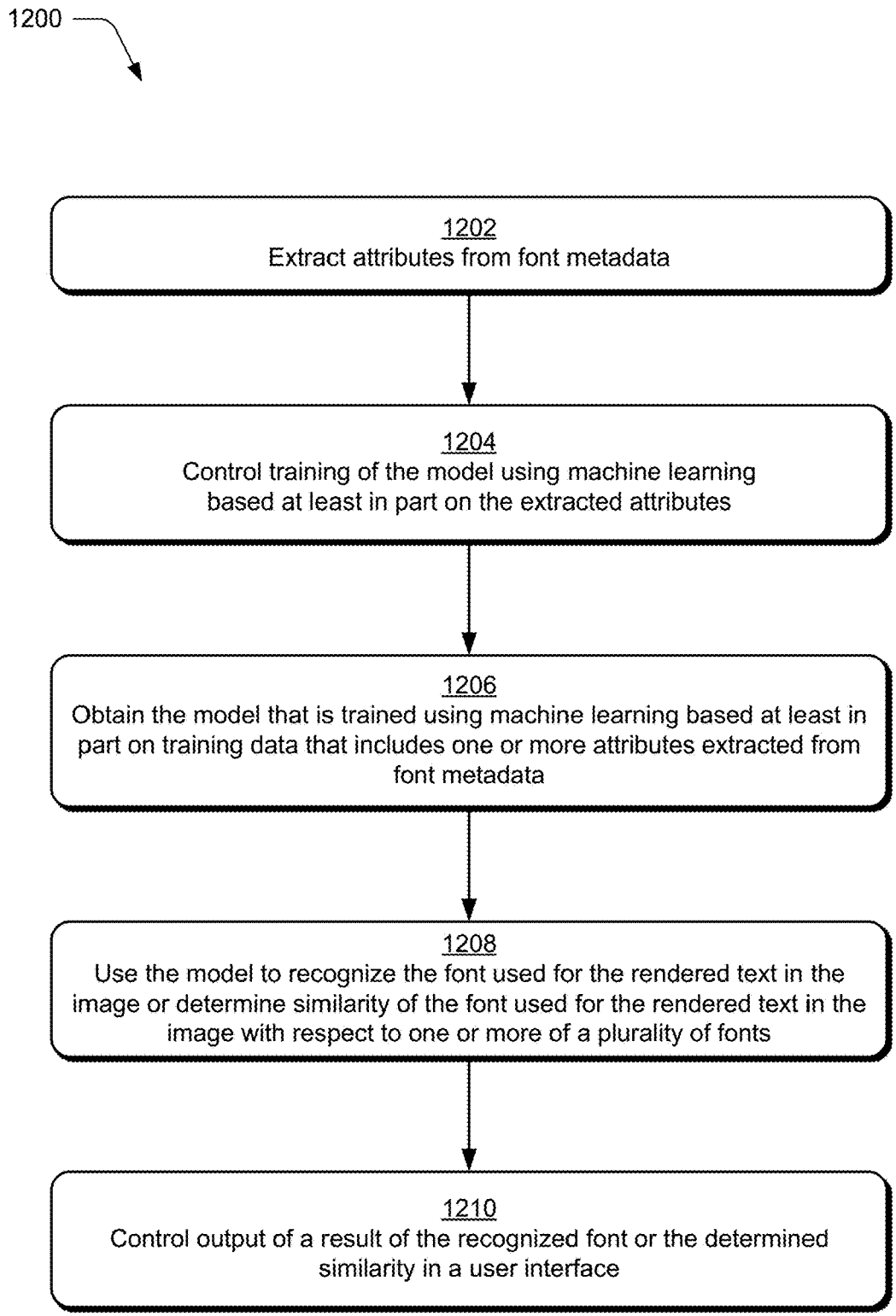
FIG. 12 is a flow diagram depicting a procedure in an example implementation that is used to train and use a model to determine fonts and font similarity by using attributes associated with the font.
Figures 13, 14:
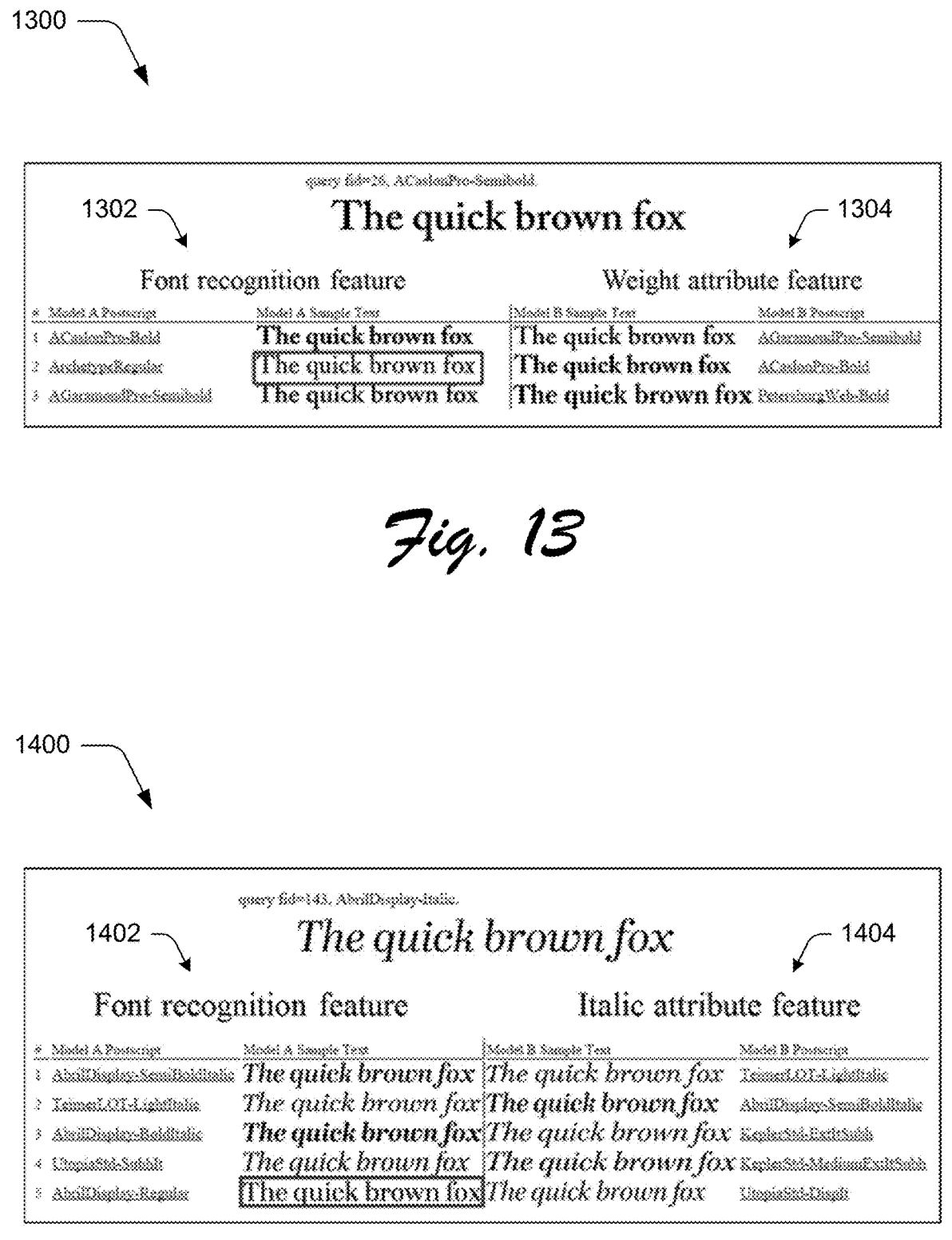

FIG. 11 depicts a system 1100 in an example implementation showing the font attribute system 126 of FIG. 1 in greater detail. FIG. 12 depicts a procedure 1200 in an example implementation that is used to train and use a model to recognize fonts and determine font similarity by using attributes taken from metadata associated with the fonts. In the following, reference is made interchangeably to both FIGS. 11 and 12 and continues on to a discussion of examples shown in FIGS. 13 and 14.

The following discussion describes techniques that may be implemented utilizing the previously described systems and devices. Aspects of the procedure may be implemented in hardware, firmware, software, or a combination thereof. The procedure is shown as a set of blocks that specify operations performed by one or more devices and are not necessarily limited to the orders shown for performing the operations by the respective blocks.

The font attribute system 126 is representative of functionality to employ metadata 816 that describes font attributes to improve visual font recognition and font similarity. As previously described, font recognition involves the challenge of recognition of the font used to render text in an image whereas font similarity involves the challenge of finding visually similar fonts for a given font. By using visual font similarity, a designer can easily browse hundreds or even thousands of fonts and find a desired font.

Techniques are described in the previous section in which a deep convolutional neural network is trained to recognize and find similar fonts. In the current example, the font attribute system 126 employs metadata 816 in order to improve accuracy and efficiency of these techniques. For instance, within a font family, different fonts 130 have different weights; fonts may have a notation of relative and italic; may come as pairs; may have classification information such as Serif, San Serif; and so forth. Accordingly, these attributes may also be leveraged to recognize a font having the described attributes as well as locate similar fonts having similar attributes as defined by associated metadata 816.

In the illustrated example, two types of attributes are defined by the metadata 816, relative attributes 1102 and categorical attributes 1104. Relative attributes 1102 describe relative characteristics of the fonts (e.g., line weight) and are usable to compare fonts within a font family and with the processing described herein are also usable to compare with fonts outside the family. For instance, font families typically order fonts by weights, by matching relative and italic pairs, and other relative attributes 1102. Accordingly, these relative attributes 1102 are usable to describe a relationship of one font within a family to other fonts within the family. Further, these relative attributes 1102 may also be quantified/normalized as further described below for comparison with fonts in other families.

On the other hand, categorical attributes 1104 describe general categories that are usable to describe the fonts, e.g., classification labels such as "Serif." However, categorical attributes 1104 can be ambiguous because the attribute is defined by a designer of the font and thus may lack standardization with other designers and may not be available in some instances. Accordingly, techniques are described in the following that employ metadata 816 to exploit relative attributes 1102 to improve both font recognition and font similarity. However, it should also be apparent that categorical attributes 1104 may also be used in some instances to improve font recognition and similarity determinations as this data, when available, may still be useful as part of these determinations.

In one example, a weight prediction function is first described in the following that is employed by the font attribute system 126. The weight prediction function is usable to learn a relative weight attribute and use this attribute for font recognition and similarity determinations. This function is first learned to compare fonts in the same font family because the weight attribute across different font families is typically not directly comparable as this value is defined by a designer of the font and thus typically lacks standardization with other designers. After learning, however, the function may then be applied to fonts from different families as further described below.

In another example that is described in greater detail below, a regular-italic classifier is employed by the font attribute system 126 that is usable to determine whether a pair of fonts are a matching pair of relative and italic fonts 130. This function is also first learned by the font attribute system 126 to compare fonts in the same family. Again, after learning, the classifier can then be applied to fonts from different families by the font attribute system 126. In yet another example that is further described in the following, the font attribute system 126 employs a unified multi-task Siamese neural network structure that is able to incorporate categorical and relative attributes for both font recognition and similarity.

In this section, metadata 816 that describes font attributes is used to improve font recognition and similarity. To begin, attributes are selected that are to be used for this task because attributes are not equally useful in terms of improving font recognition and similarity. For instance, if an attribute solely applies to a small number of fonts, although the attribute may be useful in terms of improving recognition and similarity for those particular fonts, the attribute may not generalize well to the fonts to which the attributes do not apply. Therefore, criteria that may be used in attribute selection are based on whether the attribute applies to a relatively large number of fonts.

It has been found that relative attributes 1102 are typically more widely available than categorical attributes 1104 and thus are employed in the following examples. For instance, font families typically order fonts using relative attributes 1102 including weights and by matching relative and italic pairs. On the other hand, categorical attributes 1104 such as classification labels (Serif, etc.) are typically ambiguous or not readily available for many fonts 130 although may also be used when available. In the following two relative attributes 1102 are considered, font weight and regular-italic pairs although categorical attributes 1104 are also contemplated as described above without departing from the spirit and scope thereof.

Font Weight

Fonts are typically organized by families, which are also known as typefaces. A typeface may include fonts of many weights (e.g., frm ultra-light to extra-bold or black) and typically have four to six weights although some typefaces have as many as a dozen. There are a variety of names used to describe the weight of a font in its name which differing among type foundries and designers, but the relative order of the weights is usually fixed. For example, relative attributes 1102 may describe weights such as: Hairline, Thin, Ultra-light, Extra-light, Light, Book, Normal/regular/plain, Medium, Demi-bold/semi-bold, Bold, Extra-bold/extra, Heavy, Black, Extra-black, and Ultra-black/ultra. The terms normal, regular and plain, and sometimes also as book are typically used for the standard weight font of a typeface. Where both appear and differ, book is often lighter than regular, but in some typefaces book is bolder.

A designer of a typeface also typically assigns a numeric weight property for each font in the family. For instance, the TrueType font format employs a scale from 100 through 900, which is also used in CSS and OpenType, where 400 is regular (roman or plain). It is to be noted that the base weight often significantly differs between typefaces, which means one normal font may appear bolder than some other normal font even though both are assigned the same 400 weight. For example, fonts intended to be used in posters are often quite bold by default while fonts for long runs of text are rather light. Therefore, weight designations in font names may differ in regard to the actual absolute stroke weight or density of glyphs in the font.

The relative attribute 1102 font weight is usable by the font attribute system 126 to improve font recognition and similarity by providing another source of information used to describe characteristics of the fonts. A beginning insight used to improve accuracy of this technique is to first use the weight property to compare fonts from the same family. Since the font feature representation that is learned is shared among different families, the weight function that is learned may then be applied to fonts from different families.

Accordingly, the font attribute system 126 employs a metadata attribute extraction module 1106 to extract attributes from font metadata (block 1202), such as to extract weights from the relative attributes 1102 of the metadata 816 of the fonts 130. Training of the mode using machine learning is controlled based at least in part on the extracted attributes (block 1204) by a machine learning module 1108. In the illustrated example, the machine learning module 1108 employs a neural network 110 have at least two machine learning subnets 1112, 1114 configured as a Siamese network to learn the weight function and compare fonts. The two machine learning subnets 1112, 1114 of the Siamese network are identical in this example. The end of each machines learning subnet 1112, 1114 includes a weight prediction layer that is used to predict a scalar values. An additional layer illustrated as the classifier 1116 positioned "on top" of the two identical machine learning subnets 1112, 1114 takes the two scalars and forms a binary classifier.

To train the machine learning subnets 1112, 1114 of the Siamese configured neural network 1110, ordered pairs of images are used that include text rendered using fonts 130 from the same family. Positive samples are formed such that the first image is of a font with a smaller weight and the other is of a font with a larger weight. Negative samples are formed such that the first image is of a font with a larger weight and the other is of a font with a smaller weight. Real or synthetic images may be used as described in the previous sections.

Training sample are organized as a tuple of "$(x_0, x_1, y)$" for the two images "$x_0$," "$x_1$" and binary "$(+1/-1)$" label "y" indicting positive or negative pair. The Siamese network generates the scalar weight predictions "$f_0$" and "$f_1$" for two images, and the training objective function is expressed as minimizing a hinge loss as follows:

$$\min \max(y(w_0 f_0 - w_1 f_1) + \alpha, 0) + \gamma |w|_2$$

where "$\alpha$" is the margin parameter between two weights. A value of "$\alpha$" may be modulated according to the weight attribute value or set as a constant. When "$f_0$" and "$f_1$" are predicted with a linear neuron in the last layer of the neural network, the binary classifier 1116 coefficients "$w_0$" and "$w_1$" are combinable with the weights of the last layer. In this way, the linear coefficients together with the regularization term "$y|w|_2$" in the above equation may be omitted and therefore the final objective function 1120 of the font attribute model 1118 is expressed as:

$$\min \max(y(f_0 - f_1) + \alpha, 0)$$

The scales of "$f_0$" and "$f_1$" are normalized after the last linear layer of the neural network 1110 to avoid degenerated solutions or exploding gradients.

An output of the neural network 1110 may be utilized in a variety of ways as part of font recognition and similarity determinations. In one example, the font weight attribute is used in training which is additional information to guide the learning process to form the font attribute model 1118 that is usable as part of font recognition and similarity determinations. In another example, each subnet supplies a weight prediction function that is used to predict a weight (e.g., line thickness) of a font 130. This weight prediction function is consistent across font families, and may be used to compare fonts from different font families once learned.

Regular-Italic Pairs

Fonts 130 typically employ the notion of matching regular and italic pairs. A pair of regular and italic fonts belong to the same family of fonts 130 and share a common design, e.g., the italic version slants slightly to the right. This relative attribute 1102 is also usable to improve determinations of font recognition and similarity. For example, a Siamese configuration of the neural network 1110 through use of matching machine learning subnets 1112, 1114 is used in this instance to classify matching pairs of regular and italic fonts. Different from the weight property above, a scalar prediction function is not formed because it is not used in this example.

As part of training by the machine learning module 1106, training images are used that are arranged in pairs. Positive samples are two images from the same family such that the first image is of a regular font and the second image is of a matching italic font. Negative samples are two images again from the same family such that either both images are of regular fonts (possibly the same) or both image are of italic font (possibly the same). Training samples may be organized as tuples of "$(x_0, x_1, y)$" for the two images "$x_0$," "$x_1$" and binary "$(+1/-1)$" label "y" indicting a positive or negative pair. The Siamese network generates the feature vectors "$g_0$" and "$g_1$" for two images, and the training of the objective function 1120 of the font attribute model 1118 may be expressed as minimizing a hinge loss as follows:

$$\min \max(y(h(g_0, g_1; w)) + \alpha, 0) + \gamma |w|_2$$

where "$h(g_0,g_1;w)$" is a generic classifier with input vectors "$g_0$" and "$g_1$" and parameter "$w$." The classifier 1116 can be implemented as single or multi-layer perception neural network. A classifier parameter may be optimized jointly with the Siamese neural network 1110 using back-propagation.

Unified Network for Font Recognition and Similarity

In the following, relative attributes 1102 such as the font weight for regular/italics pair are incorporated into a unified training framework with font classification. This unified training framework can apply to both font recognition and font similarity. Note that this unified training framework is not limited to these two attributes as these techniques are equally applicable to other relative attributes 1102 and even categorical attributes 1104.

In this example, Siamese configurations of different relative attribute 1102 machine learning subnets 1112, 1114 (e.g., for weight and regular/italics pairs) are combined into one and augmented with font classification through a multi-task network. To combine the two attribute Siamese networks into one from the previous sections, for instance, a single Siamese network is used which has the two tasks of the different relative attributes 1102 applied to both subnets. To augment with font classification, a softmax classification layer may be added at the end of each subnet.

Batches of images pairs are used to train the unified multi-task Siamese neural network 1110 in this example. Each batch contains a mixture of four kinds of image pairs. The first kind is two images of different weights from the same family. The second kind is negative examples of the first one. The third kind is two images of matching regular-italic pairs from the same family. Finally, the fourth kind is the negative examples of the third one.

For this multi-task network, training samples are formed as a tuple of "$(x_0, x_1, y_0, y_1, z)$" for the two images "$x_0$," "$x_1$" with font class labels "$y_0$," "$y_1$" and attribute label "$z \in \{0, 1, 2, 3\}$" indicating one out of four possible image pair kinds. The Siamese neural network 1110 generates the feature vectors "$f_0$" and "$f_1$" for two images, and the training objective function is expressed as a mixture of hybrid losses as follows:

$$\min softmax(x_0, y_0) + softmax(x_1, y_1) +$$
$$1_{z=0} \cdot \max(f_0 - f_1 + \alpha_1, 0) + 1_{z=1} \cdot \max(-f_0 + f_1 + \alpha_1, 0) +$$
$$1_{z=2} \cdot \max(h(g_0, g_1) + \alpha_2, 0) + 1_{z=3} \cdot \max(-h(g_0, g_1) + \alpha_2, 0)$$

For simplicity, parameter regularization terms and the linear coefficients used to combine different losses are omitted. Each kind of image pair is uniformly sampled during training. If there are font families with only a single font, those font images may be combined to form a fifth type of image pairs with "$z=4$." In this way, the Siamese neural network 1110 may still be optimized with the softmax loss.

Network Structure

Like above, the machine learning module 1108 uses a convolutional neural network 1110 for training. To train this neural network 1110, the initial learning rate is set to 0.01, and is reduced to 0.001 in the middle of training. Batch size is set to 128. Momentum is set to 0.9 and weight decay is set to 0.0005 for each of the layers. Dropout ratio after "fc7" and "fc8" is set to 0.5. The network structure is listed in the following table. The multi-task neural network 1110 structure may be reduced to the one of single attribute network by removing some of the loss layers.

| Name | type | Kernel size/stride | Output size |
| --- | --- | --- | --- |
| tp0 | input | | 111x111x1 |
| tp1 | input | | 111x111x1 |
| tp0_conv1/tp1_conv1 | convolution | 11x11/2 | 51x51x64 |
| tp0_pool1/tp1_pool1 | pooling | 3x3/2 | 25x25x64 |
| tp0_conv2/tp1_conv2 | convolution | 5x5/12 | 21x21x128 |
| tp0_pool2/tp1_pool2 | pooling | 3x3/2 | 10x10x128 |
| tp0_conv3/tp1_conv3 | convolution | 3x3/1 | 10x10x256 |
| tp0_conv4/tp1_conv4 | convolution | 3x3/1 | 10x10x256 |
| tp0_conv5/tp1_conv5 | convolution | 3x3/1 | 10x10x256 |
| tp0_pool5/tp1_pool5 | pooling | 5x5/5 | 2x2x256 |
| tp0_fc7/tp1_fc7 | fully connected | | 1x1x1024 |
| tp0_fc8/tp1_fc8 | fully connected | | 1x1x512 |
| tp0_fcw/tp1_fcw | fully connected, only used for weight prediction | | 1x1x1 |
| tp0_fcr/tp1_fcr | fully connected only used for regular-italic prediction | | 1x1x256 |
| fcw | Fully connected, for weight comparison | | 1x1 |
| fcr | Softmax for regular-italic | | 1x2 |
| cls0/cls1 | Softmax for font classification | | 1x4496 |

The font attribute model 1118 is obtained by the font similarity and recognition module 1122, the model trained using machine learning based at least in part on training data that includes one or more attributes extracted from the font metadata 816 (block 1206). The font attribute model 1118 is used by the font similarity and recognition module 1122 to recognize the font 1124 used for the rendered text in the image or determine similarity of the font used for the rendered text in the image with respect to one or more of a plurality of fonts 1126 (block 1208). For example, the font attributes may be used to guide the learning of the font attribute model 1118 to improve accuracy and efficiency of font recognition and similarity determination techniques. Output of a result is controlled, the result indicating the recognized font 1124 or the determined similarity 1126 in a user interface (block 1210). The user interface, for instance, may output a result indicating which fonts 130 are similar, may be used to apply the font 130 or similar font to render text based on the determination, flag text, and so forth.

Thus, in this example the font attribute system 126 uses relative font attributes 1102 in font recognition and similarity, and may also use categorical attributes 1104 when available. A unified multi-task Siamese neural network structure is also described that is able to incorporate a plurality of relative attributes, e.g., font weight and regular-italic pair attributes. This unified network applies to both font recognition and similarity and can be applied to other font attributes.

In one example, a weight prediction function is learned to compare fonts in the same family. After learning, the function can also be used to compare fonts from different families due to a shared feature representation across font families Weight prediction and comparison is useful in font selection. For instance, weight selection may be used to maps fonts 130 to a single weight axis, find fonts that have larger or smaller weights than a particular font, and so forth.

Weight prediction may also be used as an aide in font recognition and similarity. As illustrated by an example implementation 1300 of FIG. 13, the features learned from a weight attribute network 1304 function better than a font recognition feature 1302 at retrieving fonts with similar weight as the input query font.

Additionally, as described in another example above a classifier is learned that is configured to predicts matching regular and italic pairs, and may do so without using metadata. Moreover, the regular-italic classifier may also be used to improve font recognition and similarity. As illustrated by an example implementation 1400 of FIG. 14, the italic attribute features 1404 learned from regular-italic attribute network function better than font recognition features 1402 at retrieving fonts with similar italic style as the input query font. A variety of other examples are also contemplated without departing from the spirit and scope thereof.

Example System and Device

Figure 15:
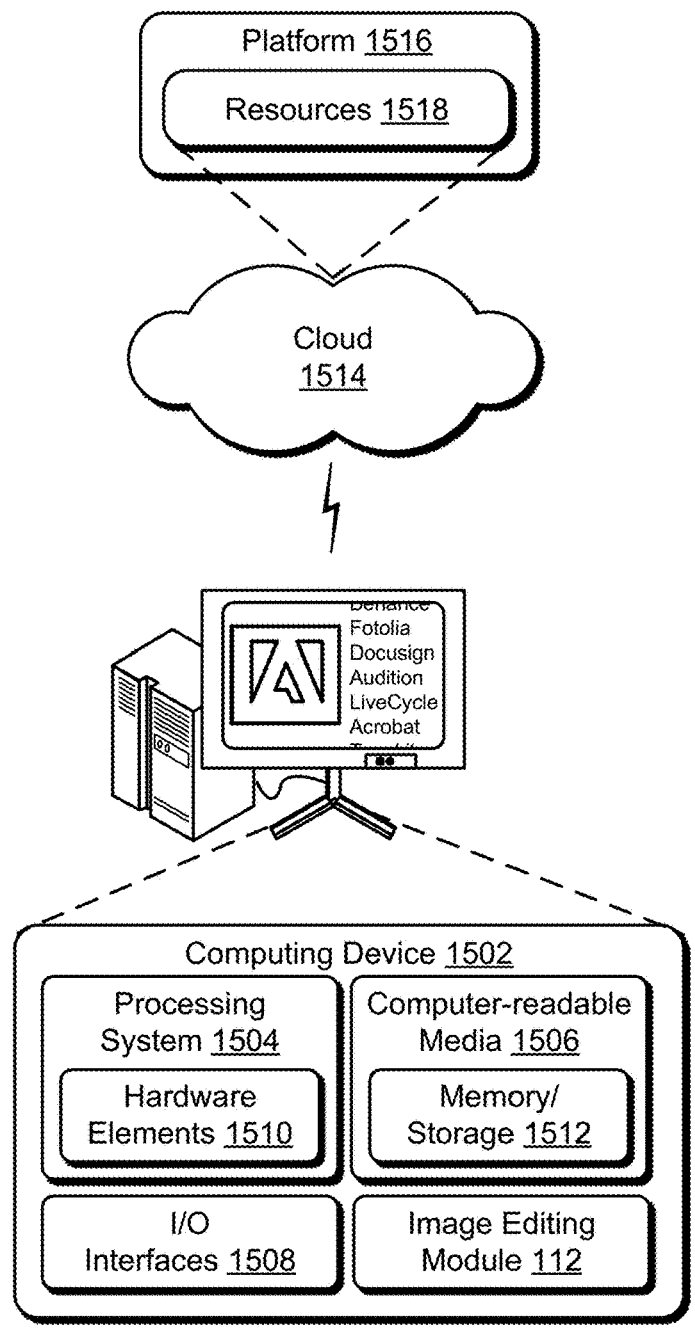
FIG. 15 illustrates an example system including various components of an example device that can be implemented as any type of computing device as described and/or utilize with reference to FIGS. 1-14 to implement embodiments of the techniques described herein.

FIG. 15 illustrates an example system generally at 1500 that includes an example computing device 1502 that is representative of one or more computing systems and/or devices that may implement the various techniques described herein. This is illustrated through inclusion of the image editing module 112. The computing device 1502 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

The techniques described herein may be supported by various configurations of the computing device 1502 and are not limited to the specific examples of the techniques described herein. This functionality may also be implemented all or in part through use of a distributed system, such as over a "cloud" 1514 via a platform 1516 as described below.

The cloud 1514 includes and/or is representative of a platform 1516 for resources 1518. The platform 1516 abstracts underlying functionality of hardware (e.g., servers) and software resources of the cloud 1514. The resources 1518 may include applications and/or data that can be utilized while computer processing is executed on servers that are remote from the computing device 1502. Resources 1518 can also include services provided over the Internet and/or through a subscriber network, such as a cellular or Wi-Fi network.

The platform 1516 may abstract resources and functions to connect the computing device 1502 with other computing devices. The platform 1516 may also serve to abstract scaling of resources to provide a corresponding level of scale to encountered demand for the resources 1518 that are implemented via the platform 1516. Accordingly, in an interconnected device embodiment, implementation of functionality described herein may be distributed throughout the system 1500. For example, the functionality may be implemented in part on the computing device 1502 as well as via the platform 1516 that abstracts the functionality of the cloud 1514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to recognize a font in rendered text in an image or determine similarity of the font in the rendered text in the image to other fonts, a method implemented by a computing device, the method comprising:
    predicting, automatically and without user intervention by the computing device, a bounding box for the rendered text in the image using a model that is trained using machine learning as applied to a plurality of training images having text rendered using the font;
    normalizing coordinates of boundaries of the rendered text using the font in the plurality of training images; and
    generating, by the computing device, an indication of the predicted bounding box, the indication specifying a region of the image that includes the rendered text having the font to be recognized.

2. The method as recited in claim 1, wherein the text rendered using the font in the plurality of training images include one or more perturbations added to the text rendered using the font in the plurality of training images.

3. The method as recited in claim 1, wherein the normalized coordinates of the boundaries of the rendered text are used as ground truth for the machine learning.

4. The method as recited in claim 1, wherein the model is a convolutional neural network learned by a stochastic gradient decent technique.

5. The method as recited in claim 1, wherein the predicting the bounding box further includes applying a horizontal squeeze to the image, an amount of the horizontal squeeze matching a training setting of the model.

6. The method as recited in claim 5, wherein the predicting the bounding box further includes:
    forming overlapping cropped images from the squeezed image;
    feeding the cropped images into the model; and
    obtaining a bounding box prediction for the cropped images using the model.

7. The method as recited in claim 6, wherein the generating the indication of the predicted bounding box further includes calculating top and bottom lines for the obtained bounding box prediction for the cropped images.

8. The method as recited in claim 1, further comprising determining a rotation of text in the image.

9. In a digital medium environment to recognize a font in rendered text in an image or determine similarity of the font in the rendered text in the image to other fonts, a system implemented by at least one computing device, the system comprising:
    a training set generation module implemented at least partially in hardware of a computing device to:
        generate a training image and a font collection that includes additional training images, and render text in the training image and the additional training images in the font collection using a selection of fonts, the rendered text including one or more perturbations; and a machine learning module implemented at least partially in hardware of the computing device to obtain the training image and the font collection and train a model to predict, automatically and without user intervention, bounding boxes using machine learning applied to the training image and the font collection.

10. The system as described in claim 9, wherein the training set generation module is further configured to generate the training image and the additional images in the font collection as synthetic images using a selection of fonts.

11. The system as described in claim 9, wherein the training set generation module is further configured to:
generate the training image and the font collection including the additional training images using the rendered text including the one or more perturbations.

12. The system as described in claim 9, wherein the model is a convolutional neural network, and wherein the machine learning module is further configured to train the convolutional neural network by a stochastic gradient decent technique.

13. The system as described in claim 9, further comprising:
a text localization module implemented at least partially in the hardware of the computing device to:
obtain the model;
predict a bounding box for the image using the obtained model, in part, by applying horizontal squeeze to the image, an amount of the horizontal squeeze matching a training setting of the obtained model; and
generate an indication of the predicted bounding box specifying a region of the image that includes text having a font to be recognized.

14. The system as described in claim 13, wherein the predicting the bounding box further includes:
forming overlapping cropped images from the squeezed image;
feeding the cropped images into the model; and
obtaining a bounding box prediction for the cropped images using the model.

15. The system as described in claim 14, wherein the generating the indication of the predicted bounding box further includes calculating top and bottom lines for the obtained bounding box prediction for the cropped images.

16. In a digital medium environment to recognize a font in rendered text in an image or determine similarity of the font in the rendered text in the image to other fonts, a system implemented by at least one computing device, the system comprising:
means for obtaining a plurality of training images having a text rendered using a font;
means for training a model to:
predict, automatically and without user intervention, bounding boxes for text in images, the model trained using machine learning as applied to the plurality of training images having text rendered using the font, and
normalize coordinates of boundaries of the text rendered using the font in the plurality of training images;
means for predicting, automatically and without user intervention, a bounding box for the rendered text in the image using the model; and
means for generating an indication of the predicted bounding box, the indication specifying a region of the image that includes the rendered text having a font to be recognized.

17. The system as described in claim 16, wherein the text rendered using the font in the plurality of training images include one or more perturbations added to the text rendered using the font in the plurality of training images.

18. The system as described in claim 16, the normalized coordinates of the boundaries of the text are used as ground truth for the machine learning.

19. The system as described in claim 16, wherein the model is a convolutional neural network learned by a stochastic gradient decent technique.

20. The system as described in claim 16, wherein the means for generating the indication is further configured to determine a rotation of text in the image.

* * * * *